(12) United States Patent
Irazabal

(10) Patent No.: US 12,206,781 B2
(45) Date of Patent: Jan. 21, 2025

(54) METHOD AND SYSTEM TO VALIDATE UNIQUENESS IN A DATA STORE

(71) Applicant: International Business Machines Corporation, Armonk, NY (US)

(72) Inventor: Jeronimo Irazabal, Roque Perez (AR)

(73) Assignee: International Business Machines Corporation, Armonk, NY (US)

(*) Notice: Subject to any disclaimer, the term of this patent is extended or adjusted under 35 U.S.C. 154(b) by 318 days.

(21) Appl. No.: 16/567,489

(22) Filed: Sep. 11, 2019

(65) Prior Publication Data

US 2021/0075617 A1    Mar. 11, 2021

(51) Int. Cl.
H04L 29/06         (2006.01)
G06F 16/22         (2019.01)
G06F 16/2458       (2019.01)
H04L 9/32          (2006.01)

(52) U.S. Cl.
CPC ........ H04L 9/3218 (2013.01); G06F 16/2246 (2019.01); G06F 16/2462 (2019.01); H04L 9/3236 (2013.01)

(58) Field of Classification Search
CPC . H04L 9/3218; H04L 9/3236; H04L 2209/38; H04L 9/3239; G06F 16/2462; G06F 16/2246
See application file for complete search history.

(56) References Cited

U.S. PATENT DOCUMENTS

| | | | | |
|---|---|---|---|---|
| 8,543,539 | B2* | 9/2013 | Ahluwalia | G06F 16/2282 707/613 |
| 10,298,395 | B1 | 5/2019 | Schiatti et al. | |
| 10,642,994 | B1* | 5/2020 | Allen | H04L 63/0428 |
| 11,449,325 | B2* | 9/2022 | Hatakeyama | H04L 63/0428 |
| 2011/0218972 | A1* | 9/2011 | Tofano | G06F 16/1752 707/E17.002 |
| 2012/0047284 | A1* | 2/2012 | Tarkoma | H04L 67/04 709/247 |
| 2015/0242478 | A1* | 8/2015 | Cantwell | H04L 12/1403 707/634 |
| 2016/0344737 | A1 | 11/2016 | Anton et al. | |
| 2017/0373855 | A1* | 12/2017 | Pritchard | H04L 67/12 |
| 2018/0218005 | A1* | 8/2018 | Kuhtz | G06F 8/71 |
| 2018/0331832 | A1 | 11/2018 | Pulsifer | |
| 2020/0167360 | A1* | 5/2020 | Rath | G06F 16/252 |

OTHER PUBLICATIONS

Mel, et al. "The NIST Definition of Cloud Computing". Recommendations of the National Institute of Standards and Technology. Nov. 16, 2015.
Bloom filter, https://en.wikipedia.org/wiki/Bloom_filter.
Merkle tree, https://en.wikipedia.org/wiki/Merkle_tree.

* cited by examiner

Primary Examiner — Joseph P Hirl
Assistant Examiner — Chi D Nguy
(74) Attorney, Agent, or Firm — Robert D. Bean

(57) ABSTRACT

A method, system and apparatus of for validating uniqueness of a non-disclosed element of data, including in response to receiving a plurality of elements, generating an index of the plurality of elements of data received from a data store to create uniquely indexed data, generating filters from the index, generating a hash tree for the uniquely indexed data using the index, and validating a unique element of data from the hash tree and filters.

20 Claims, 15 Drawing Sheets

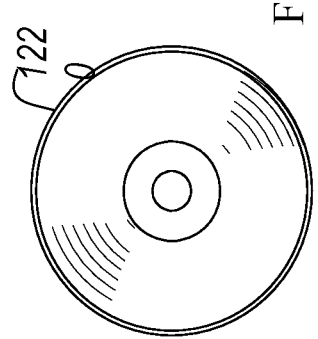
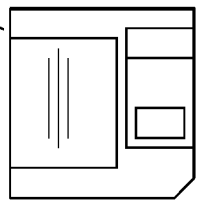
FIG. 12

METHOD AND SYSTEM TO VALIDATE UNIQUENESS IN A DATA STORE

BACKGROUND OF THE INVENTION

Field of the Invention

The disclosed invention relates generally to an embodiment of a method and system for demonstrating uniqueness, and more particularly, but not by way of limitation, relating to a method, apparatus, and system for probabilistic verification of uniqueness in a data store.

Description of the Background Art

Hash trees or Merkle-trees are widely used in many applications. They are incredibly useful because they can be used to demonstrate content belonging to a set. However, such proofs are not tailored to demonstrate uniqueness of the data within the set. Hash trees or Merkle-trees are used in blockchain, cryptography, data communication, and other applications to ensure data integrity A hash tree or Merkle tree is a tree in which every leaf node is labelled with the hash of a data block, and every non-leaf node is labelled with the cryptographic hash of the labels of its child nodes. Merkle trees and variations can, for example, provide consistency verification, data verification, and data synchronization.

Hash trees are widely used in blockchain to demonstrate that a given transaction is indeed included into a particular block. Since every entry in the blockchain is unable to be changed, then you have proof that this specific object existed at a certain point in time. Using an application programming interface (API), an object can be verified and validated. The API again creates a unique identifier and verifies this unique identifier against the Blockchain. However, this data structure of hash trees can be used in any solution that requires a mathematical proof that an element belong to a dataset.

Hash trees allow efficient and secure verification of the contents of large data structures. Hash trees are a generalization of hash lists and hash chains. However, demonstrating uniqueness of the data has been difficult and not shown in current solutions.

Therefore, there is a need to provide a device, system and a method of efficiently determine probabilistic verification of uniqueness in data.

SUMMARY OF INVENTION

In view of the foregoing and other problems, disadvantages, and drawbacks of the aforementioned background art, an exemplary aspect of the disclosed invention provides a method, apparatus, and system for method, apparatus, and system for probabilistic verification of uniqueness in a data store. One aspect of the present invention is to provide a method for validating uniqueness of a data store, including generating an index of a plurality of elements of data received from a data store to create uniquely indexed data, generating filters from the index, generating a hash tree for the uniquely indexed data using the index; and validating a unique element of data from the hash tree and filters.

Another aspect of the present invention provides a system for confirming uniqueness of a non-disclosed element of data, including a client computer, including a memory storing computer instructions; and a processor configured to execute the computer instructions to: in response to receiving a plurality of elements of data from a data storage networked with the client computer, generating an index of the plurality of elements of data received to create uniquely indexed data, generating filters from the index, generating a hash tree for the uniquely indexed data using the index; and confirming a unique element of the data from the hash tree and filters.

Another example aspect of the disclosed invention is to provide a computer program product comprising a computer readable storage medium having program instructions embodied therewith, the program instructions readable and executable by a computer to cause the computer to perform a method, including in response to receiving a plurality of elements of data from a data store, generating an index of the plurality of elements of data received to create uniquely indexed data, generating filters from the index, generating a hash tree for the uniquely indexed data using the index; and validating a unique element of the data from the hash tree and filters.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 12 illustrates a signal-bearing storage medium for storing machine-readable instructions of a program that implements the method according to the example embodiment of the invention.

DETAILED DESCRIPTION OF PREFERRED EMBODIMENTS

Figure 1:
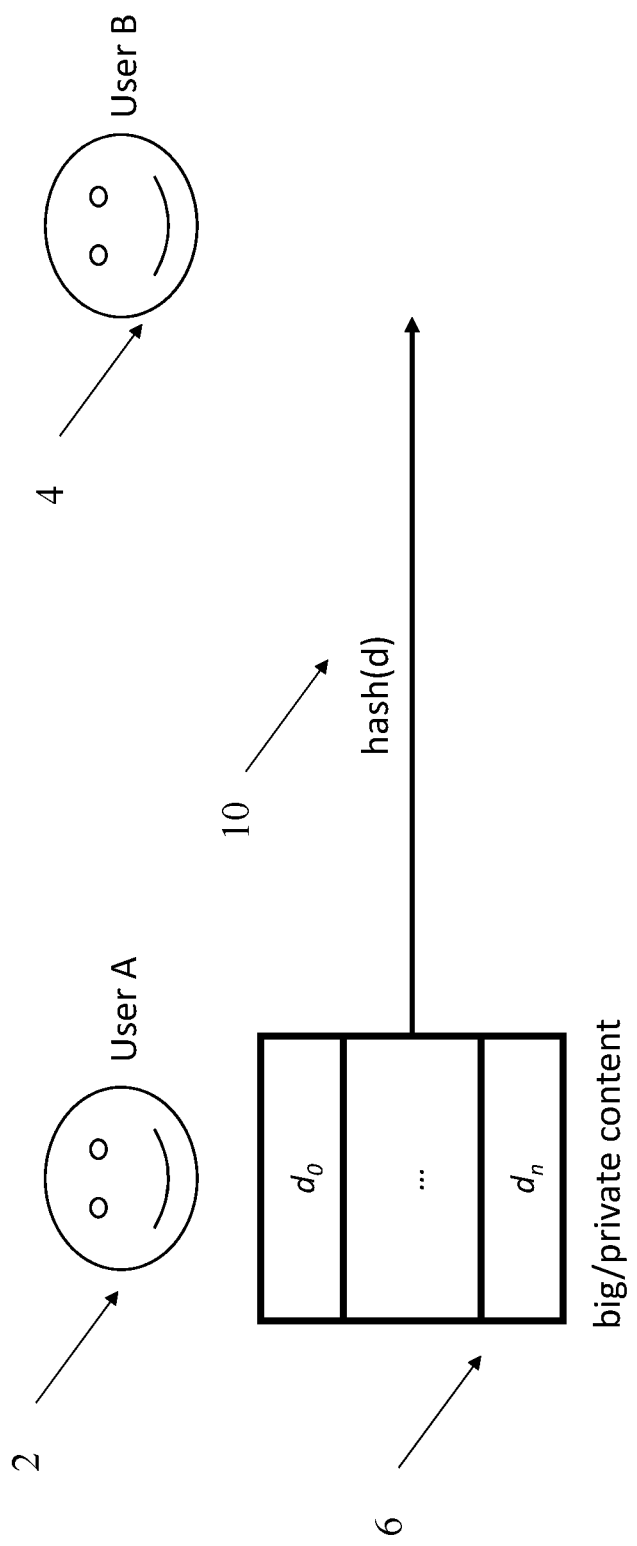
FIG. 1 illustrates issues to be resolved.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Hash trees or Merkle-trees are widely used in many applications. Hash trees or Merkle-trees are incredibly useful because they can be used to demonstrate content belong to a set. However, such proofs are not tailored to demonstrate uniqueness of the data within the set.

A hash tree or Merkle tree is a tree constructed by hashing paired data (the leaves), then pairing and hashing the results until a single hash remains, the Merkle root. In the Merkle tree, there is a tree in which every leaf node is labelled with the hash of a data block, and every non-leaf node is labelled with the cryptographic hash of the labels of its child nodes. Hash trees allow efficient and secure verification of the contents of large data structures.

As mentioned, hash trees are widely used in blockchain to demonstrate that a given transaction is indeed included into a particular block. However, this data structure can be used in any solution that requires a mathematical proof that an element belong to a dataset. A hash function takes a group of characters (called a key) and maps it to a value of a certain length (called a hash value or hash). The hash value is representative of the original string of characters, but is normally smaller than the original.

Demonstrating uniqueness without revealing content is provided in the following. The following describes a method to demonstrate uniqueness by generating a Merkle-tree with data and indexes.

FIG. 1 illustrates issues to be resolved. How can user A 2 demonstrate an entry di (from $d_0$ to $d_n$) 6 was known by user A 2? Furthermore, how can user A 2 give a proof of uniqueness without revealing content to user B 4? How can it be demonstrated that only one value was settled? These are some of the questions to be asked. The hash (d) of the content $d_0$ to $d_n$ 6 can be provided to user B 4.

Figure 2:
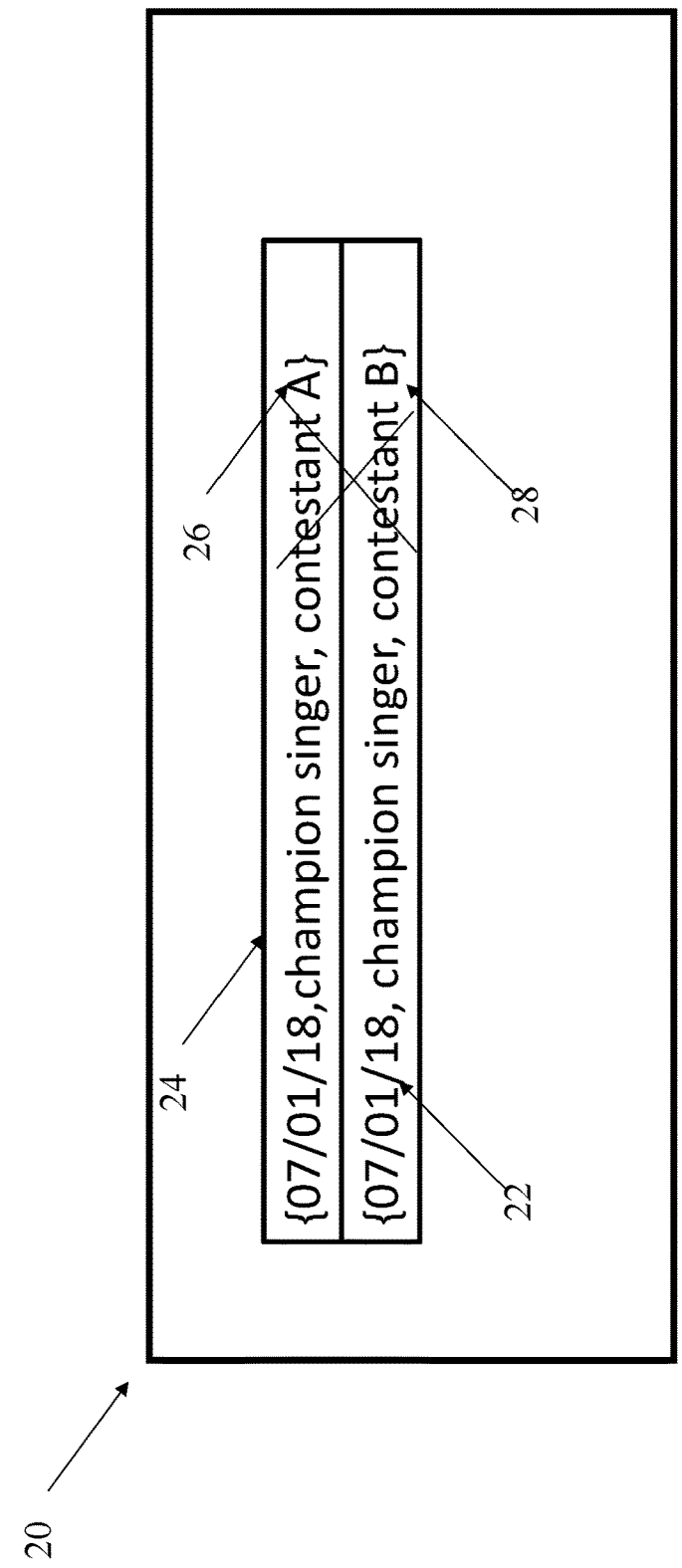
FIG. 2 illustrates an example problematic scenario.

FIG. 2 illustrates an example problematic scenario.

In many use cases, demonstrating knowledge at a previous time is not enough but evidence that only one value for the "same entry" may be required. For example, the result of a singing contest winner of contestant A 26 and contestant B 28 cannot be selected for the same time of Jul. 1, 2018 (22). Two different results of the winner 26 and 28 are outputted 20. Forecasting, Choices, Measurements, etc. can be different applications.

Figure 3:
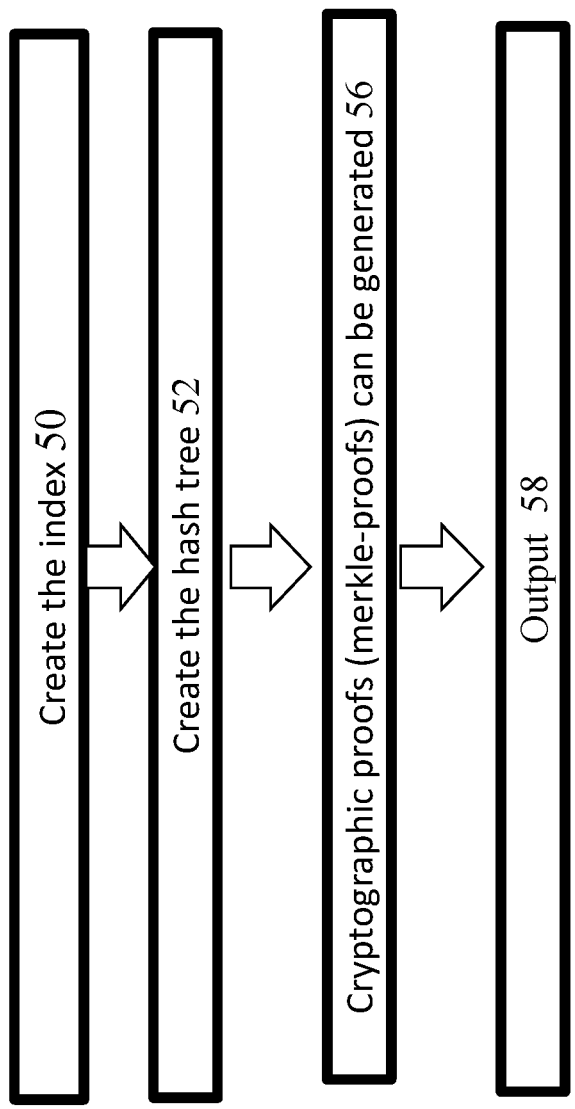
FIG. 3 illustrates a method of an example embodiment.

FIG. 3 illustrates a method of an example embodiment.

The solution of the system 100 consists in combining the creation of an index and generating the hash tree from the entries with probabilistic filters populated with the index.

Figure 4:
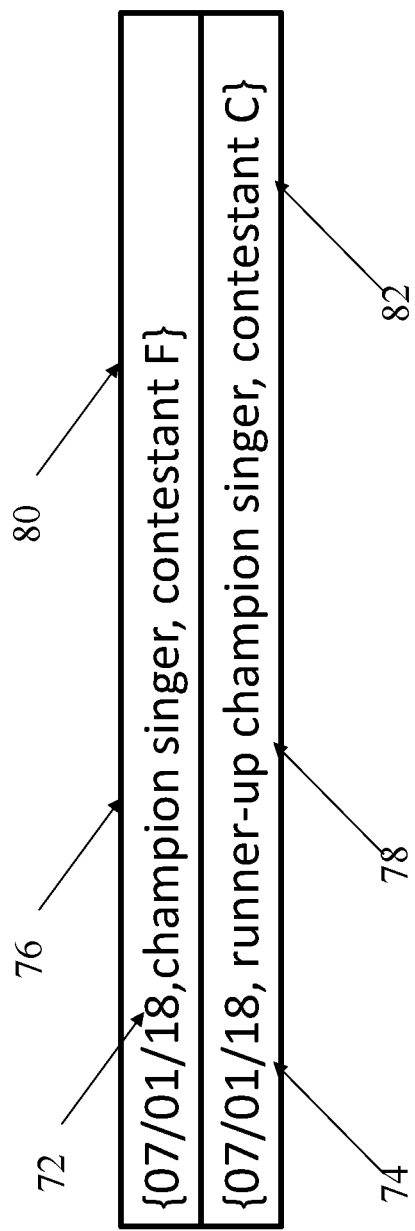
FIG. 4 illustrates an index of the example embodiment.

The steps include creating the index 50 by the system 100. FIG. 4 illustrates an index 70. Referring to FIG. 4, the index can include the dates of Jul. 1, 2018 for entry 72 and entry 74, singing contest winner 76 as contestant F 80 and the singing contest runner-up (sub-champion) field 78 with contestant C 82 as the result.

Referring back to FIG. 3, then, secondly the system 100 creates the hash tree 52 with the indexed entries, where the index is used to populate probabilistic filters.

Third, Cryptographic proofs (Merkle-proofs) can be generated to demonstrate uniqueness 56 for output 58 by the system 100.

Figure 5:
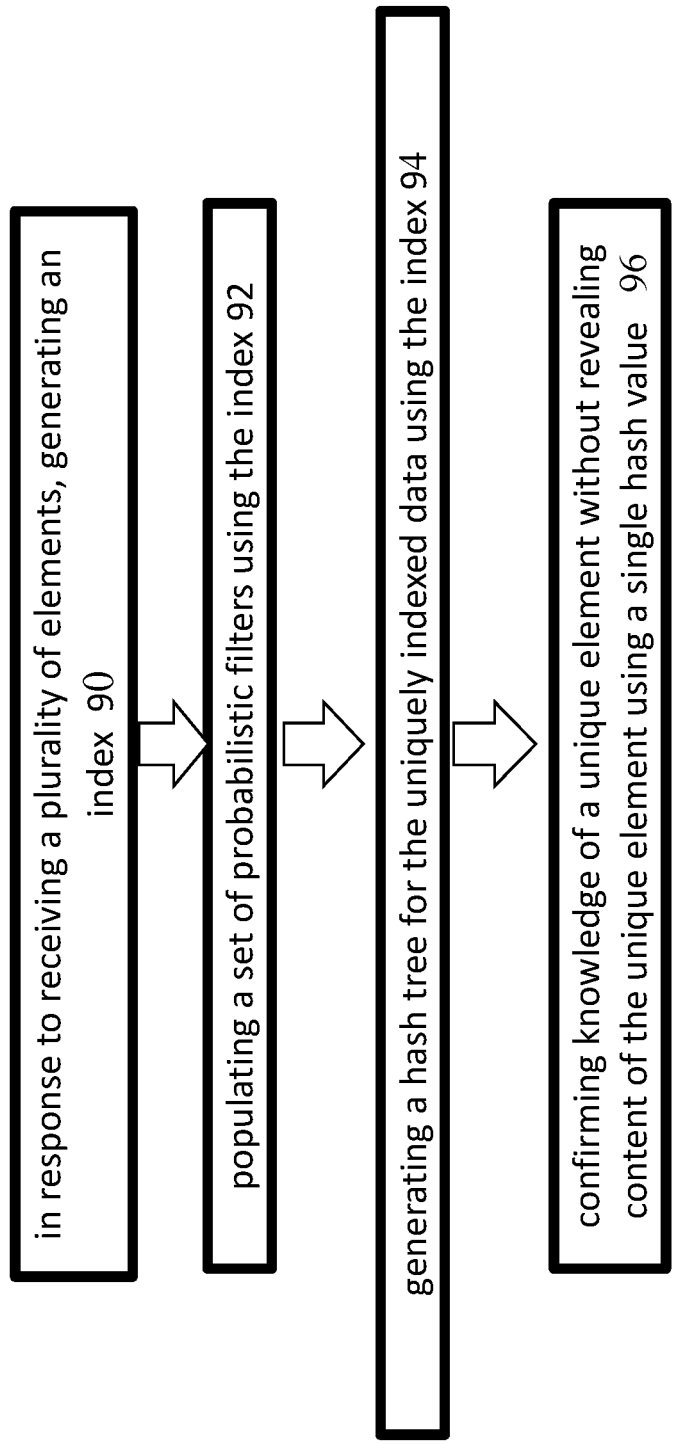
FIG. 5 provides another illustration of the example embodiment

FIG. 5 provides another illustration of the example embodiment.

Another way to state the method of FIG. 3, there is a system 200 in FIG. 5 with a computer-implemented process for confirming uniqueness of a non-disclosed element. The computer-implemented process in system 200 includes the following steps. First, in response to receiving a plurality of elements, the system 200 generates an index of the plurality of elements received to create uniquely indexed data in step 90. Thereafter, the system 200. populates a set of probabilistic filters using the index in step 92. Then, system 200 generates a hash tree for the uniquely indexed data using the index in step 94. Then the system 200 confirms knowledge of a unique element without revealing content of the unique element using a single hash value in step 96. Therefore, the system 200 validates a unique element without revealing the content of the unique element in step 96.

Concerning validating a uniqueness in step 96, for example, the system 200 can validate that at most one temperature was registered at a given point in time and location. Another example would be that the system 200 validates that at most one location was registered for any vehicle at a given point in time.

Filters are generated after or while data is indexed but before the hash tree generation. because hash tree generation needs the data and the filters. Once the hash tree is generated, cryptographic proofs can be constructed to demonstrate uniqueness of any document in the data set, or in the most general terms, to demonstrate uniqueness of one or several elements in the dataset, i.e., cryptographic proofs could be constructed to demonstrate uniqueness of more than a single document at a time.

Figure 6:
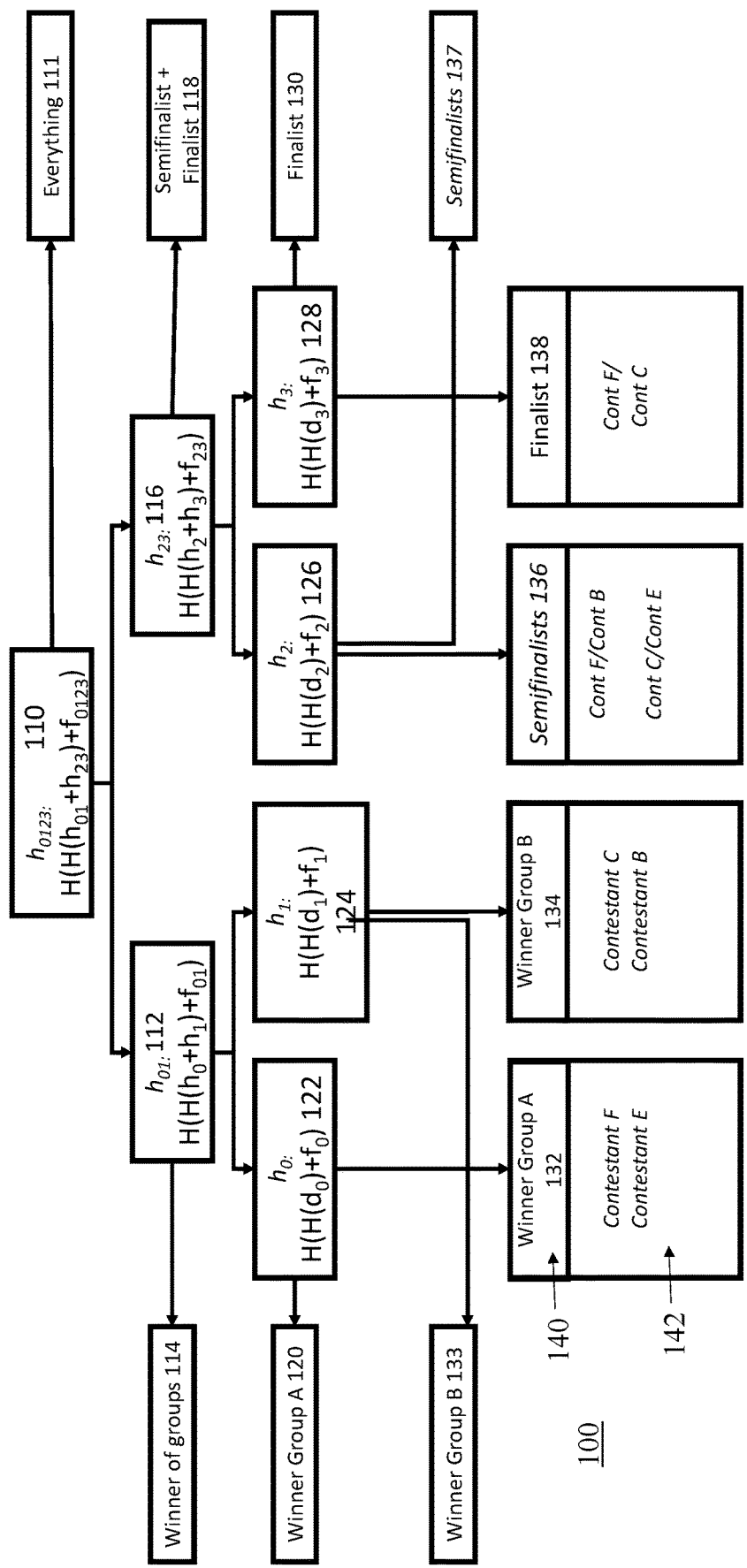
FIG. 6 illustrates a Hash tree for uniquely indexed data of an example embodiment.

FIG. 6 illustrates a Hash tree for uniquely indexed data of an example embodiment. Hash functions (e.g., H) and filters (e.g., $f_{0123}$) are shown. First, $h_{0123}$:$H(H(h_{01}+h_{23})+f_{0123})$ in node 110 provides everything 111. $h_{01}$: $H(H(h_0+h_1)+f_{01})$ 112 provides the winner of groups 114 to forward to the next branch $h_{23}$: $H(H(h_2+h_3)+f_{23}$ in node 116 provides the semi-finalist and the finalist 118. $h_0$: $H(H(d_0)+f_0)$ 122 provides the winner of group A 120 which would be Contestant F and Contestant E at 132. $h_1$: $H(H(d_1)+f_1)$ 124 provides the winner for Group B 133, which would be Contestant C or Contestant B at 134. $h_2$: $H(H(d_2)+f_2)$ 126 would provide the semifinalists 137 which would be Contestant F/Contestant B and Contestant C/Contestant E at 136. $h_3$: $H(H(d_3)+f_3)$ 128 provides the finalist 130 which would be Contestant F/Contestant C at 138. The index 140 would be the winner of the group, and the data 142 would be, for example, Contestant F and Contestant E.

Therefore, as seen above, the method constructs a hash tree. The construction of the hash tree starts with the elements to be stored, by taking to two elements, appending them and calculating the hash. And then do the same process with the calculated hashes in the step before. This is done until just one element is obtained, being the root hash of the tree. In the present invention, the system 100, 200 not only takes into account the elements, but also the filters, thus the term includes the filter e.g. $f_{0123}$ together with the hash of the two elements taken (e.g., $H(h_{01}+h_{23})$ as seen in node 110.

Moreover, when the hash tree is constructed using not only the data elements but the probabilistic filters and the parent node gets the value as $H(H(ha+hb)+f)$, actually there is multiple and valid ways to calculate the hash of that upper node e.g. $H(ha+hb+H(f))$, $H(H(ha+hb)+H(f))$. All would be equivalent in respect to the possibility to construct a cryptographic proof but with minor differences in terms of the elements which compose it.

It is not the same, but compare the following $1+(3+5)$ and $(1+3)+5$, both result in 9, but the terms are different. Therefore, the present invention is not limited to any specific way of calculating the hash value for the nodes, but to include the hash values of its children and the filter or the hash of the filter that contains the elements in such subtree.

Figure 7:
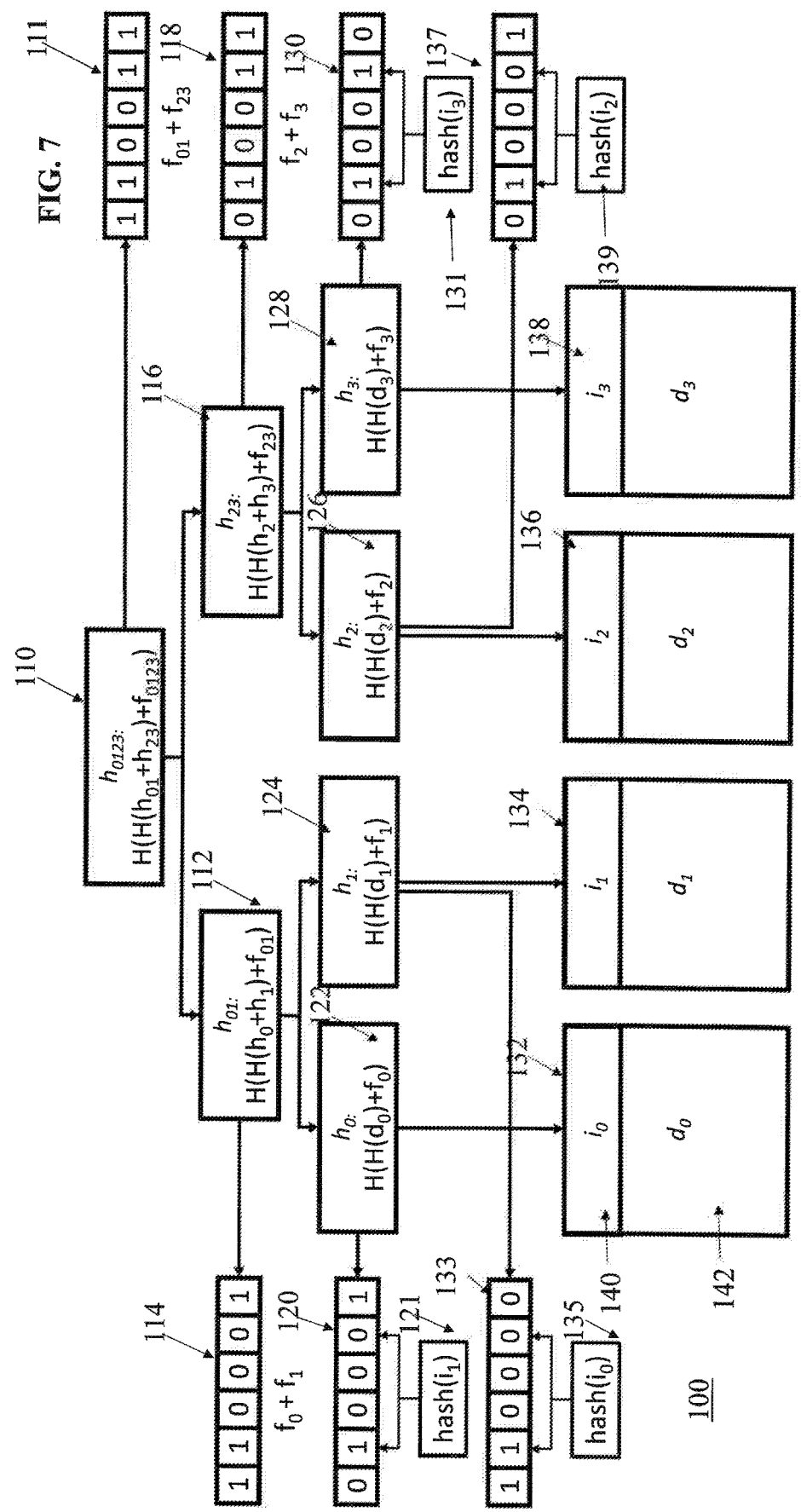
FIG. 7 illustrates another Hash tree for uniquely indexed data of an example embodiment.

FIG. 7 illustrates another Hash tree for uniquely indexed data of an example embodiment.

First, $h_{0123}$: $H(H(h_{01}+h_{23})+f_{0123})$ in node 110 provides everything to node 112 and 114. Bit vector for $f_{01}+f_{23}$ is provided (110011) in reference 111. $h_{01}$: $H(H(h_0+h_1)+f_{01})$ uses the bit vector $f_0+f_1$ as (110001) for reference 114. $h_{23}$: $H(H(h_2+h_3)+f_{23})$ in node 116 provides an output to node 126 and 128 where $f_2+f_3$ is (010011) at reference 118. $h_0$: $H(H(d_0)+f_0)$ 122 provides an output to node 132, where hash ($i_1$) 121 is (010001) at 121. $h_1$: $H(H(d_1)+f_1)$ 124 provides an output at 134, where hash ($i_0$) provides (110000) 133. $h_2$: $H(H(d_2)+f_2)$ 126 would provide an output to node 136, where hash ($i_2$) at 139 provides the bit vector (010001) at 137. $h_3$: $H(H(d_3)+f_3)$ 128 provides an output to node 138, where hash ($i_3$) at 131 provides a bit vector (010010) (010001) at 130. The index $i_0$ to $i_3$ 140 and data do to $d_3$ 142 are provided at nodes 132 to 138.

Figure 8:
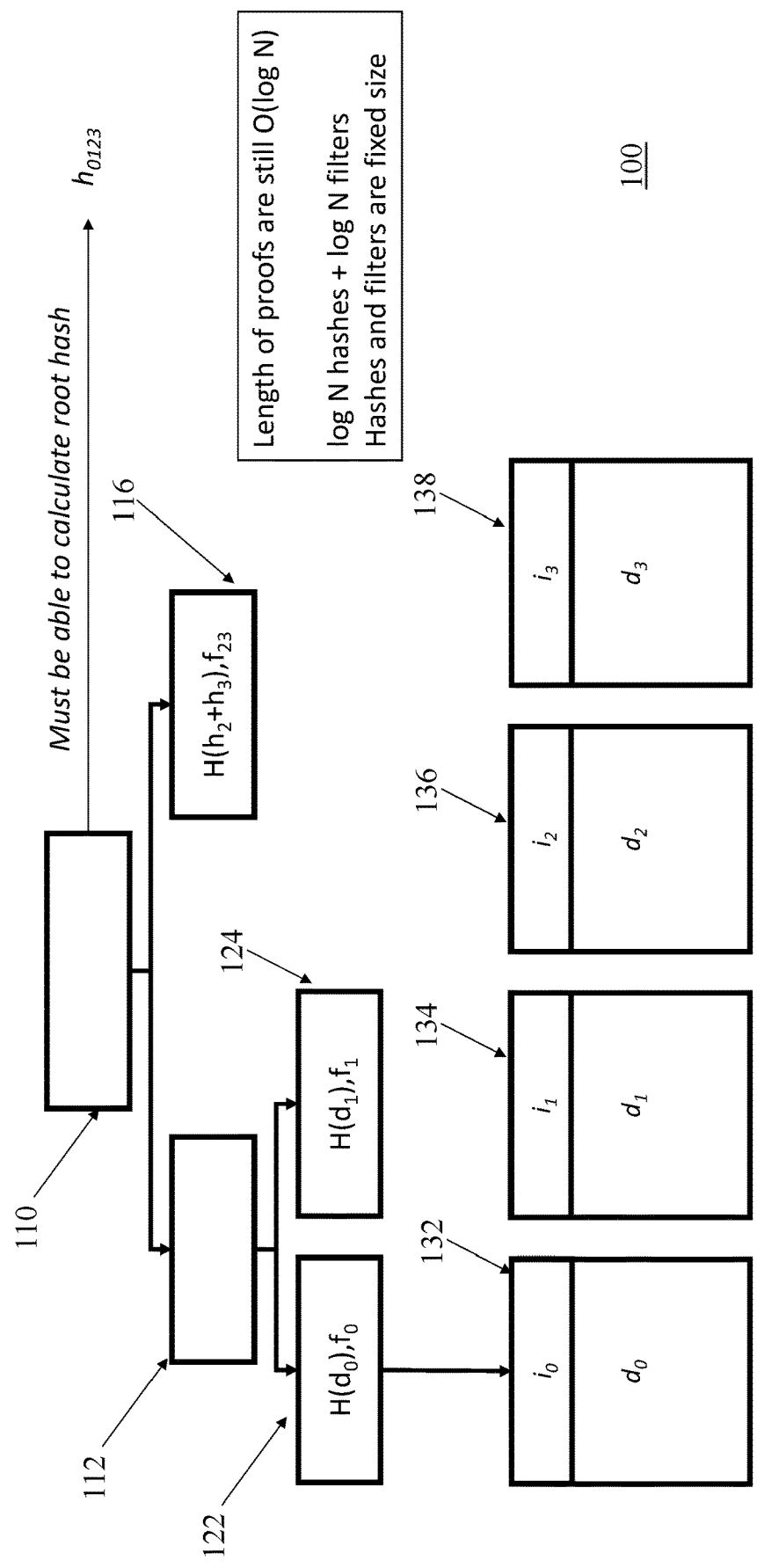
FIG. 8 illustrates a proof of uniqueness of an example embodiment.

FIG. 8 illustrates a proof of uniqueness of an example embodiment.

Proof of uniqueness: Crypto-proofs or Merkle-proofs are augmented with filters created with the indexes. As seen in node 110, the root hash $h_{0123}$ must be able to be calculated. Length of proofs are still O(log N), where log N hashes+log N filters, and hashes and filters are fixed size.

The method to demonstrate uniqueness includes the construction of an index from the entries, the generation of a hash tree and filters from the index, and the single hash value that can be used by data owners to evidence knowledge without revealing content. Hash tree generation for uniquely indexed data, generation combining entries and indexes. Bloom filter can be used to probe an entry was the last one for a given index.

Applications can include a block chain because settlement is the most used feature and by doing the settlement of the root hash of a Merkle-tree to later demonstrate previous knowledge and uniqueness may be interesting for many applications. Proposed solution can be widely applicable not only for settlement in blockchain networks but on any exchange between parties or systems, security, privacy, cryptography, and e-payments.

All of the elements may be non-disclosed by the data owner until the moment the data owner wants to disclose some partial content of the data without reveling entirely. So, it is possible for the data owner to build a cryptographic proof from the element the system 100, 200 will demonstrate was included in the original dataset.

Therefore, the method is multi-stage, first the data owner (or system 100, 200) creates the index and the hash tree using the data and index. That will generate a root digest. Such a root digest may be sent to a third party, published elsewhere even in a public blockchain. Such root digest becomes the witness for all the dataset.

Stated in another way, the method has at least two stages, the first one of the stages generates a root digest which act as a witness and may be distributed to interested third parties, published into a public blockchain, etc. The second stage consist of generating cryptographic proof starting from partial content of the original dataset, that when evaluated match with the root digest calculated in the first stage.

The cryptographic proof when evaluated, must match with the root digest calculated for the hash tree generated in the first state.

Therefore, the solution is meant for the owner of a dataset to be able to demonstrate uniqueness of each record to third parties, without having to reveal the entire dataset but just the records or partial information that in fact want to be demonstrated.

The root digest is calculated by the data owner (or at least driven by the data owner using a service) or system 100, 200, data gets indexed, a hash tree is calculated based on the unique records and probabilistic filters populated with index keys.

Figure 9:
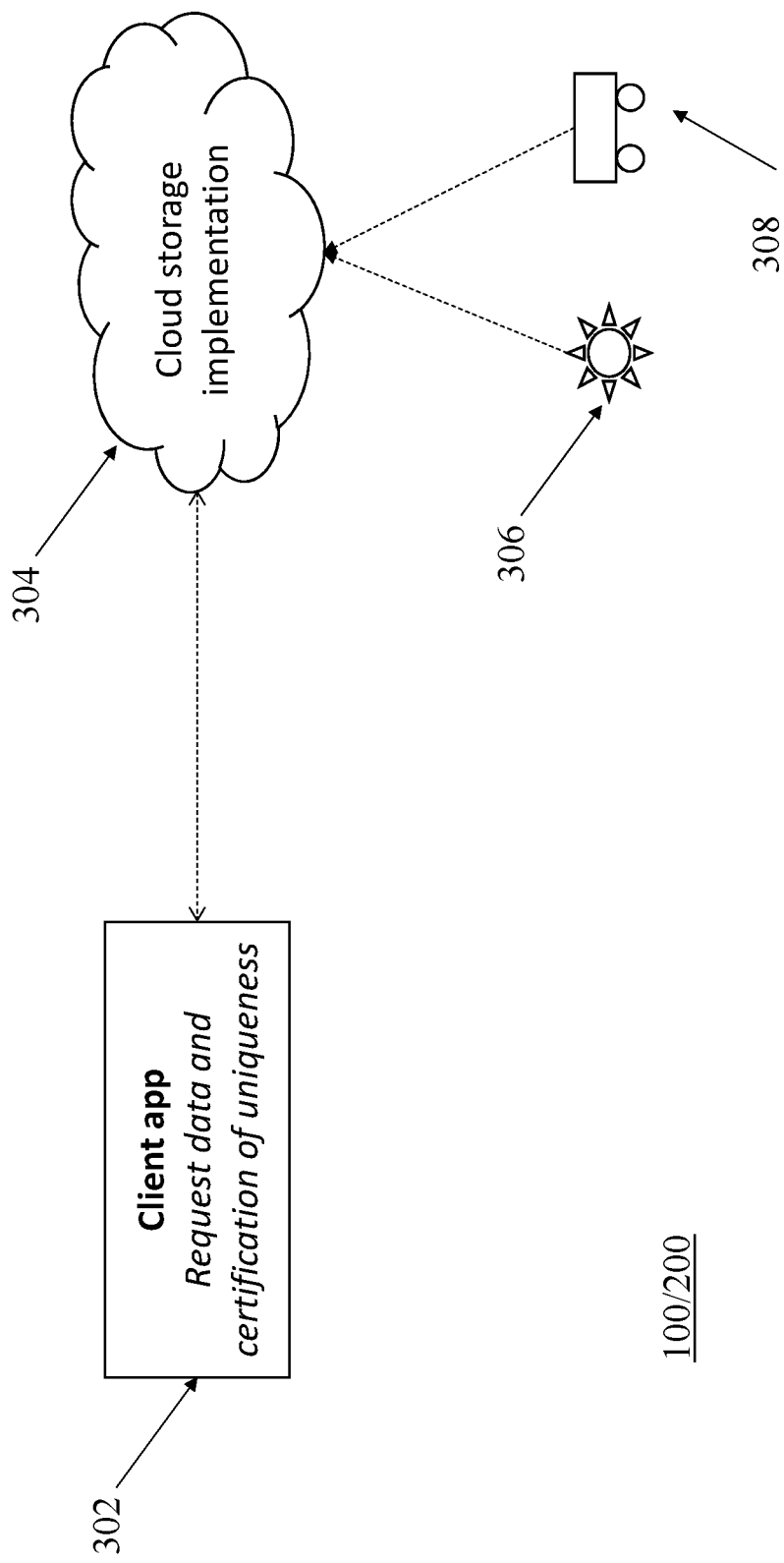
FIG. 9 illustrates another example implementation.

FIG. 9 illustrates an example implementation. With the method described, client app (application) 302 can validate that at most one temperature was registered at a given point in time and location. The temperature 306 and the location 308 is submitted to cloud storage 304 in the system 100, 200. The submission of temperature 306 and the submission of a location of a vehicle can be from different IoT (Internet of Things) devices. With the method described, the client app 302 can validate that at most one location 306 that was registered for any vehicle 308 at a given point in time. The validation can be done by the client app 302 without having to trust on the cloud storage 304. Cloud storage 304 may frequently publish the root digest calculated for the data or sent upon request by the client app 302. Once such value is provided by the system 100, 200, validations can be made by the client app 302.

The "non-disclosed elements" can be data measurements (such as temperature 306 and location 308) registered by multiple IoT (Internet of Things) devices (e.g., 306 and 308). The Internet of Things, or IoT, is a system of interrelated computing devices, mechanical and digital machines, objects, animals or people that are provided with unique identifiers (UIDs) and the ability to transfer data over a network without requiring human interactions.

When a client app 302 request a data, it can do a validation of uniqueness of the data without having to reveal all measurements in the cloud storage 304.

The present invention leverages such data structure combined with probabilistic filters to also demonstrate the element is singled valued (according to the index).

Probabilistic filters can be high-speed, space-efficient data structures that support set-membership tests with a one-sided error. These filters can claim that a given entry is definitely not represented in a set of entries, or might be represented in the set. That is, negative responses are conclusive, whereas positive responses incur a small false positive probability (FPP). Examples can be Bloom filters, Cuckoo filters, etc.

Figure 10:
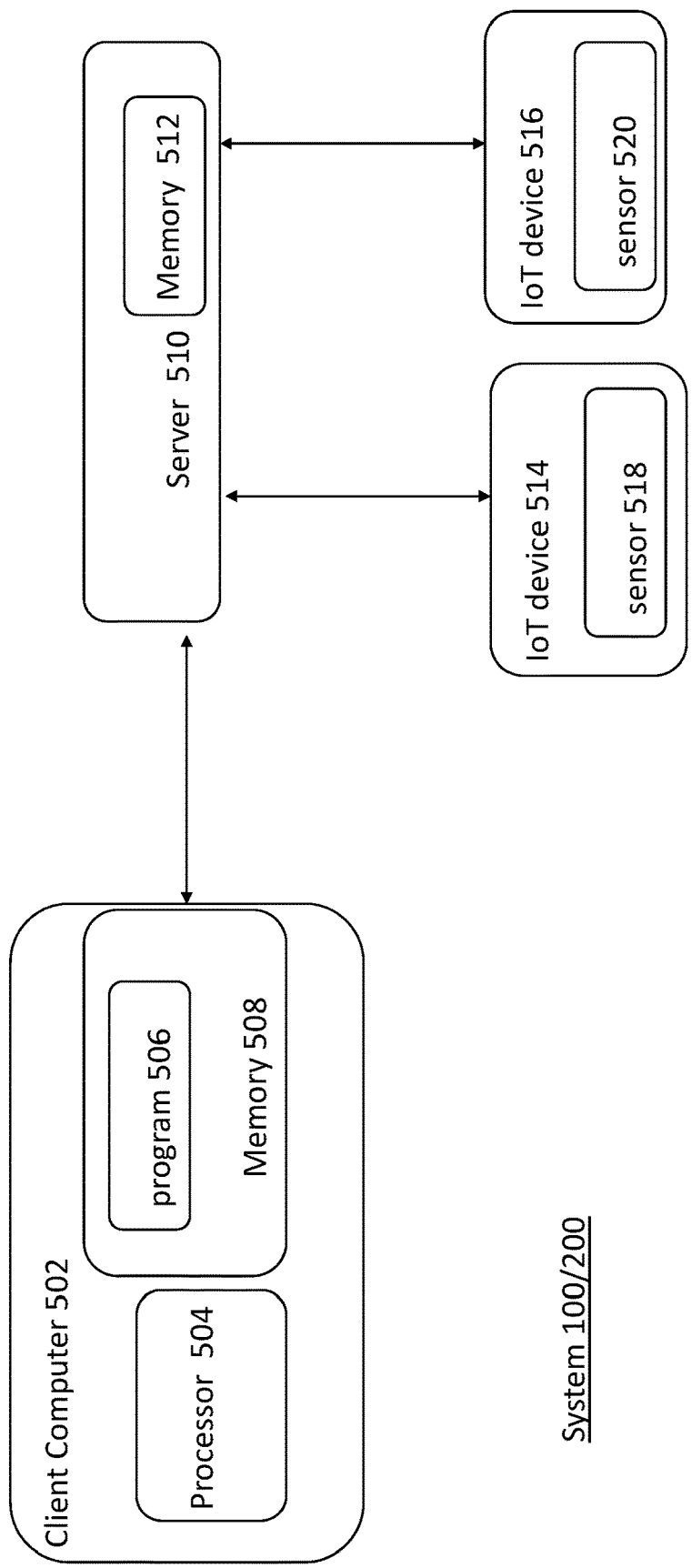
FIG. 10 illustrates an example configuration of the example embodiment.

FIG. 10 illustrates an example configuration of the example embodiment. The system 100, 200 includes a client computer 502, which communicates with the server 510.

The server 510 communicates with the IoT devices 514 and 516. The Client computer 502 includes a processor that executes the program 506 in memory 508. The server 510 stores information in memory 512 received from the IoT devices 514 and 516. The IoT device 514 can includes a sensor 518 and IoT device 516 includes a sensor 520 to monitor environment temperature, location, etc. for transmission to the server 510. The client computer 502, server 510 and IoT devices 514 and 516 are connected through a network.

The program 506 can validate that at most one temperature that was registered at a given point in time and location from IoT device 514 and IoT device 516. The temperature and the location is submitted to memory 512 of the server 510. The submission of temperature and the submission of a location of a vehicle can be from different IoT (Internet of Things) devices 514 and 516. With the method described, the software program 506 can validate that at most one location that was registered for any vehicle at a given point in time. The validation can be done by the program 506 without having to trust on the storage in memory 512 of the server 510. The storage in memory 512 of the server 510 may frequently publish the root digest calculated for the data or sent upon request by the software program 506. Once such value is provided by the system 100, 200, validations can be made by the program 506.

The system 100 and 200 executes the processes including for confirming uniqueness of a non-disclosed element, including in response to receiving a plurality of elements, generating an index of a plurality of elements received to create uniquely indexed data, generating a hash tree for the uniquely indexed data using the index, generating filters from the index, and confirming knowledge of a unique element from the hash tree and filters.

Figure 11:
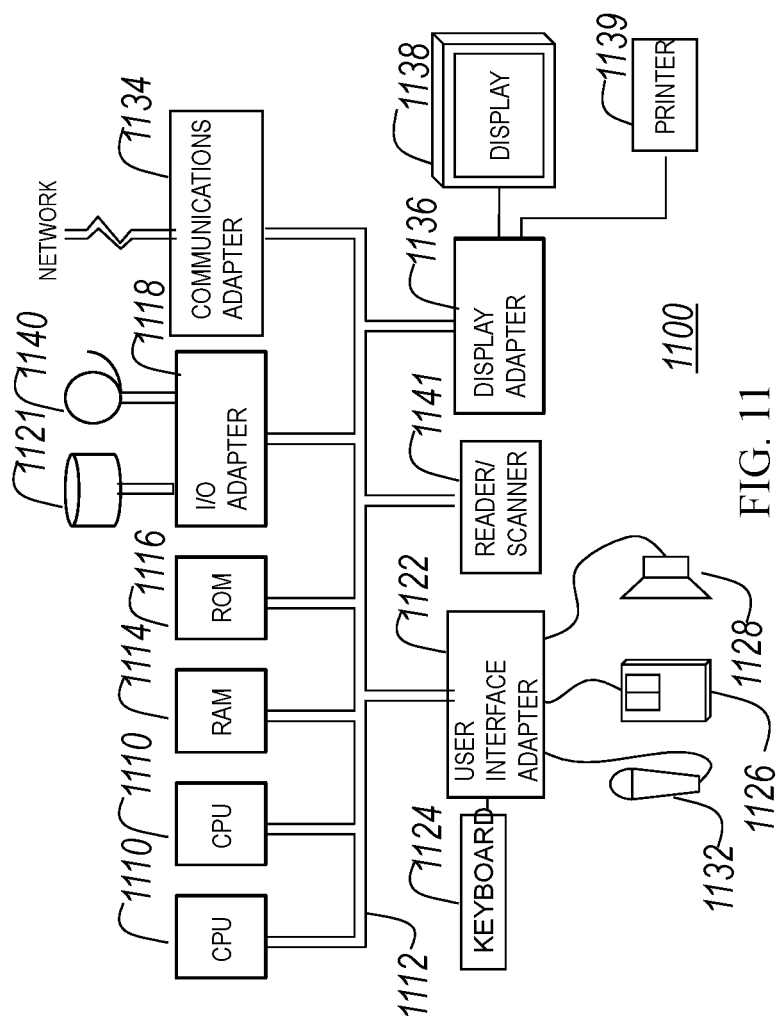
FIG. 11 illustrates an exemplary hardware/information handling system for incorporating the example embodiment of the invention therein.

FIG. 11 illustrates another hardware configuration of the system 100, where there is an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 12), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
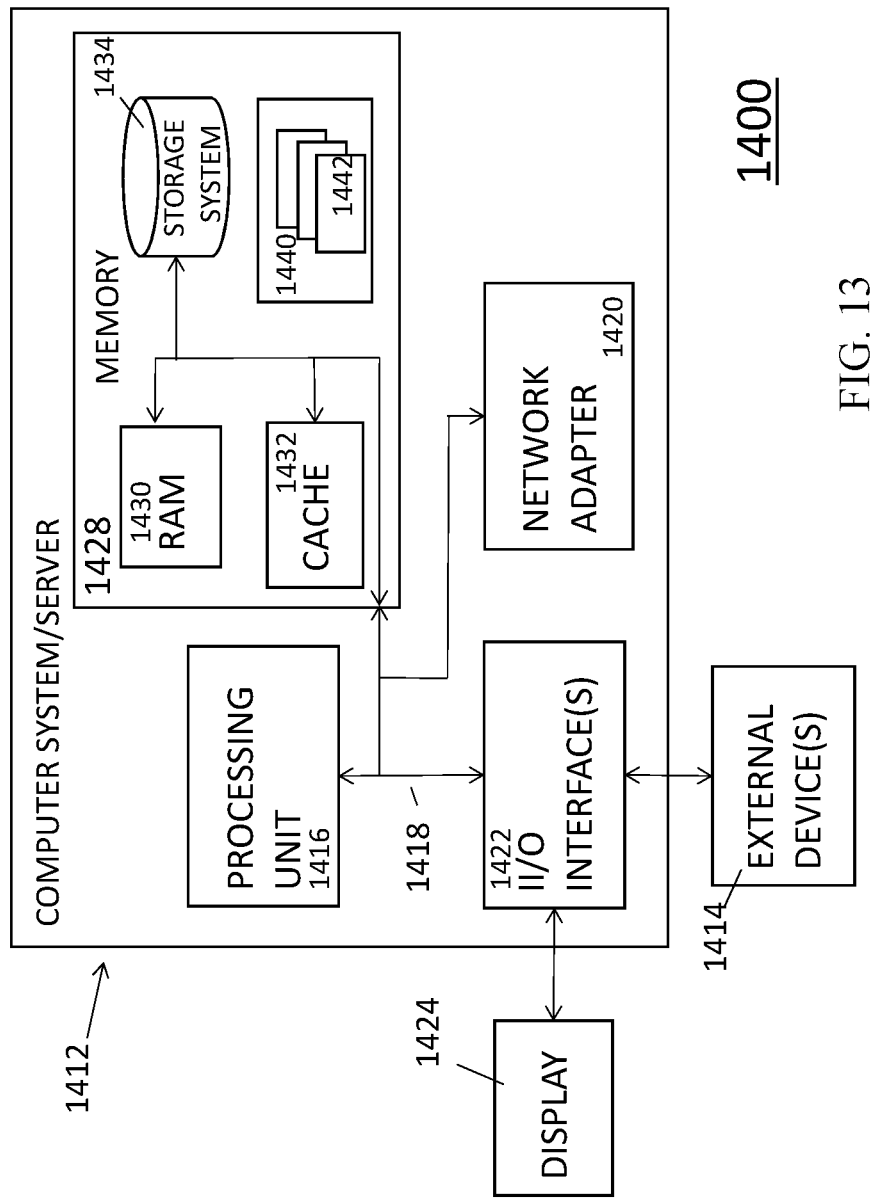
FIG. 13 depicts a cloud computing node according to an example embodiment of the present invention.

Referring now to FIG. 13, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 14:
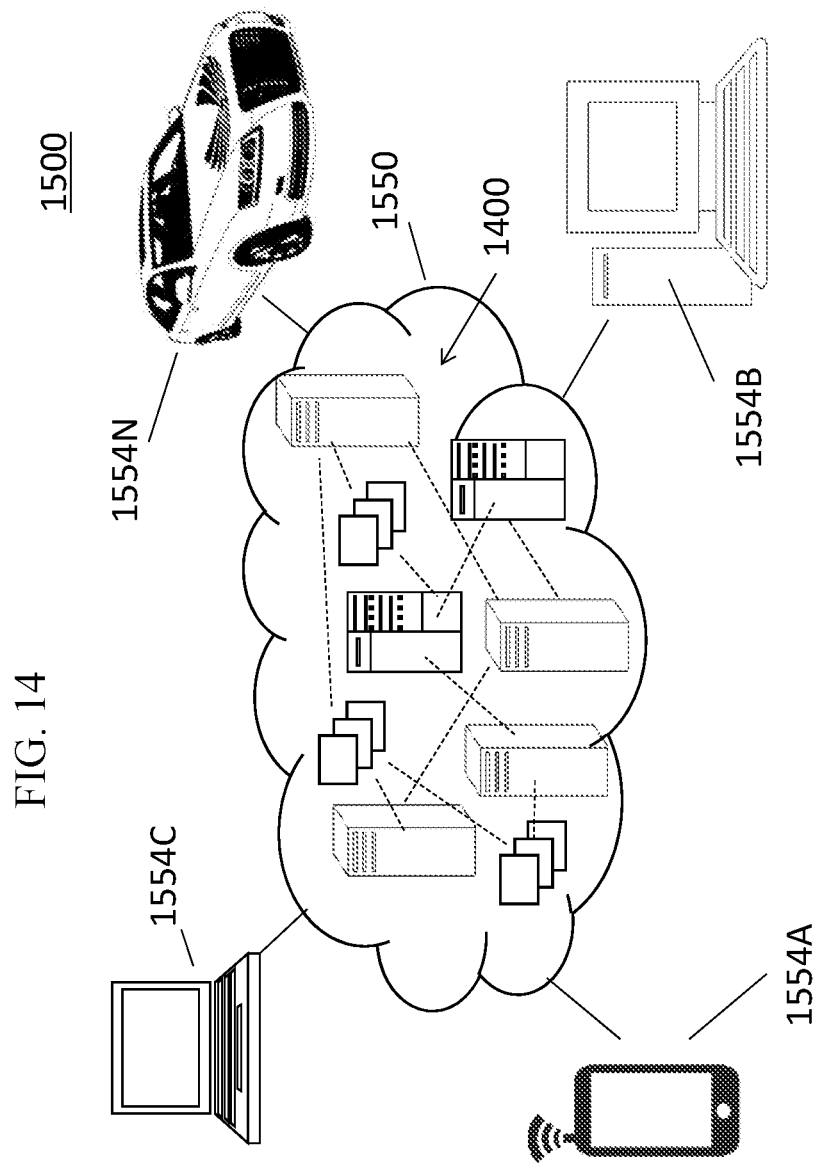
FIG. 14 depicts a cloud computing environment according to an example embodiment of the present invention.

Referring now to FIG. 14, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 14 are intended to be illustrative only and that computing nodes 1400 and cloud computing environment 1550 can communicate with any type of computerized device over any type of network and/or network addressable connection (e.g., using a web browser).

Figure 15:
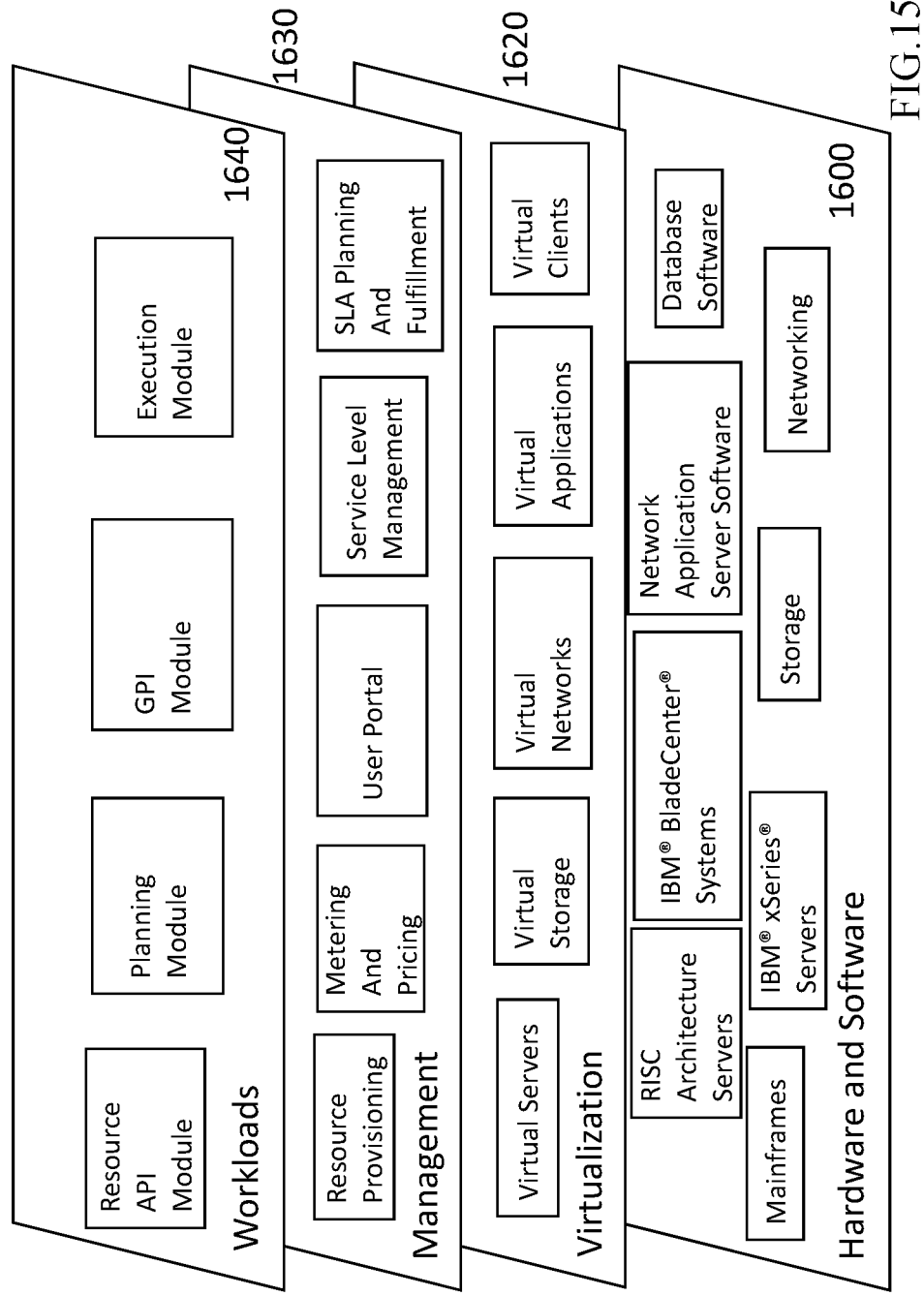
FIG. 15 depicts abstraction model layers according to an example embodiment of the present invention.

Referring now to FIG. 15, a set of functional abstraction layers provided by cloud computing environment 1550 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method for validating uniqueness of elements in a data store, comprising:
   generating an index of a plurality of elements of data received from a data store to create uniquely indexed data;
   generating filters from the index;
   generating a hash tree for the uniquely indexed data using the filters, wherein one or more nodes comprising the hash tree includes a hash value of one or more of the filters; and
   validating a unique element of data from the hash tree for the uniquely indexed data and the filters from the index.

2. The method of claim 1, wherein a plurality of Internet of Things (IoT) devices sends the plurality of elements of data for storage in the data store, wherein generating filters comprises populating a set of probabilistic filters using the index, and wherein the filters are generated after or while the data is being indexed.

3. The method of claim 1, wherein the validating of the unique element of data is without revealing content of the unique element using a single hash value.

4. The method of claim 1, wherein the generating of the hash tree further comprises creating the hash tree with indexed entries, the index entries being used to populate probabilistic filters, and wherein the validating of the unique element of data is concealing the content of the unique element using a single hash value.

5. The method of claim 1, wherein validating of the unique element of the data comprises cryptographic proofs being generated to demonstrate uniqueness.

6. The method of claim 1, wherein validating the unique element of the data comprises Merkle proofs being generated to demonstrate uniqueness.

7. The method of claim 1, wherein the filters include a bloom filter used to probe an entry was the last one for the index, wherein a plurality of Internet of Things (IoT) devices sends the plurality of elements of data for storage in the data store, wherein generating filters comprises populating a set of probabilistic filters using the index, and wherein the filters are generated after the data is being indexed.

8. The method according to claim 1 being cloud implemented.

9. A system for confirming uniqueness of a non-disclosed element of data, comprising: a client computer, comprising:
   a memory storing computer instructions; and
   a processor configured to execute the computer instructions to:
      in response to receiving a plurality of elements of data from a data storage networked with the client computer, generating an index of the plurality of elements of data received to create uniquely indexed data;
      generating filters from the index;
   generating a hash tree for the uniquely indexed data using the filters, wherein one or more nodes comprising the hash tree includes a hash value of one or more of the filters; and
   confirming a unique element of the data from the hash tree for the uniquely indexed data and the filters from the index.

10. The system according to claim 9, further comprising:
    an Internet of Things (IoT) device generating the plurality of elements of data that are non-disclosed, and wherein generating filters comprises populating a set of probabilistic filters using the index, wherein the confirming of the unique element of data is concealing the content of the unique element using a single hash value.

11. The system according to claim 9, wherein the confirming of the unique element of data is without revealing content of the unique element using a single hash value.

12. The system according to claim 9, wherein the generating of the hash tree further comprises creating the hash tree with indexed entries, the index entries being used to populate probabilistic filters.

13. The system according to claim 9, wherein the confirming the unique element of data comprises cryptographic proofs being generated to demonstrate uniqueness.

14. The system according to claim 9, wherein confirming the unique element of data comprises Merkle proofs being generated to demonstrate uniqueness, and wherein the confirming of the unique element of data is at partially concealing content of the unique element using a single hash value, and wherein the confirming the unique element of data comprises cryptographic proofs being generated to demonstrate uniqueness.

15. The system according to claim 9, wherein the filters include a Bloom filter used to probe an entry was the last one for the index.

16. A computer program product comprising a computer readable storage medium having program instructions embodied therewith, the program instructions readable and executable by a computer to cause the computer to perform a method, comprising:
    in response to receiving a plurality of elements of data from a data store, generating an index of the plurality of elements of data received to create uniquely indexed data;
    generating filters from the index;
    generating a hash tree for the uniquely indexed data using the filters, wherein one or more nodes comprising the hash tree includes a hash value of one or more of the filters; and
    validating a unique element of the data from the hash tree for the uniquely indexed data and the filters from the index.

17. The computer program product according to claim 16, wherein generating filters comprises populating a set of probabilistic filters using the index, and wherein the validating of the unique element of data comprises cryptographic proofs being generated to demonstrate uniqueness.

18. The computer program product according to claim 16, wherein the validating of the unique element of the data is without revealing content of the unique element using a single hash value, and wherein the validating of the unique element of data is concealing the content of the unique element using a single hash value.

19. The computer program product according to claim 16, wherein the generating of the hash tree further comprises creating the hash tree with indexed entries, the index entries being used to populate probabilistic filters, and wherein the validating of the unique element of the data comprises Merkle proofs being generated to demonstrate uniqueness.

20. The computer program product according to claim 16, wherein validating the unique element of the data comprises cryptographic proofs being generated to demonstrate uniqueness, and the data store being cloud implemented.

* * * * *